May 18, 1926.
J. M. WIDMER
MANUFACTURE OF STARCH
Filed Dec. 26, 1924
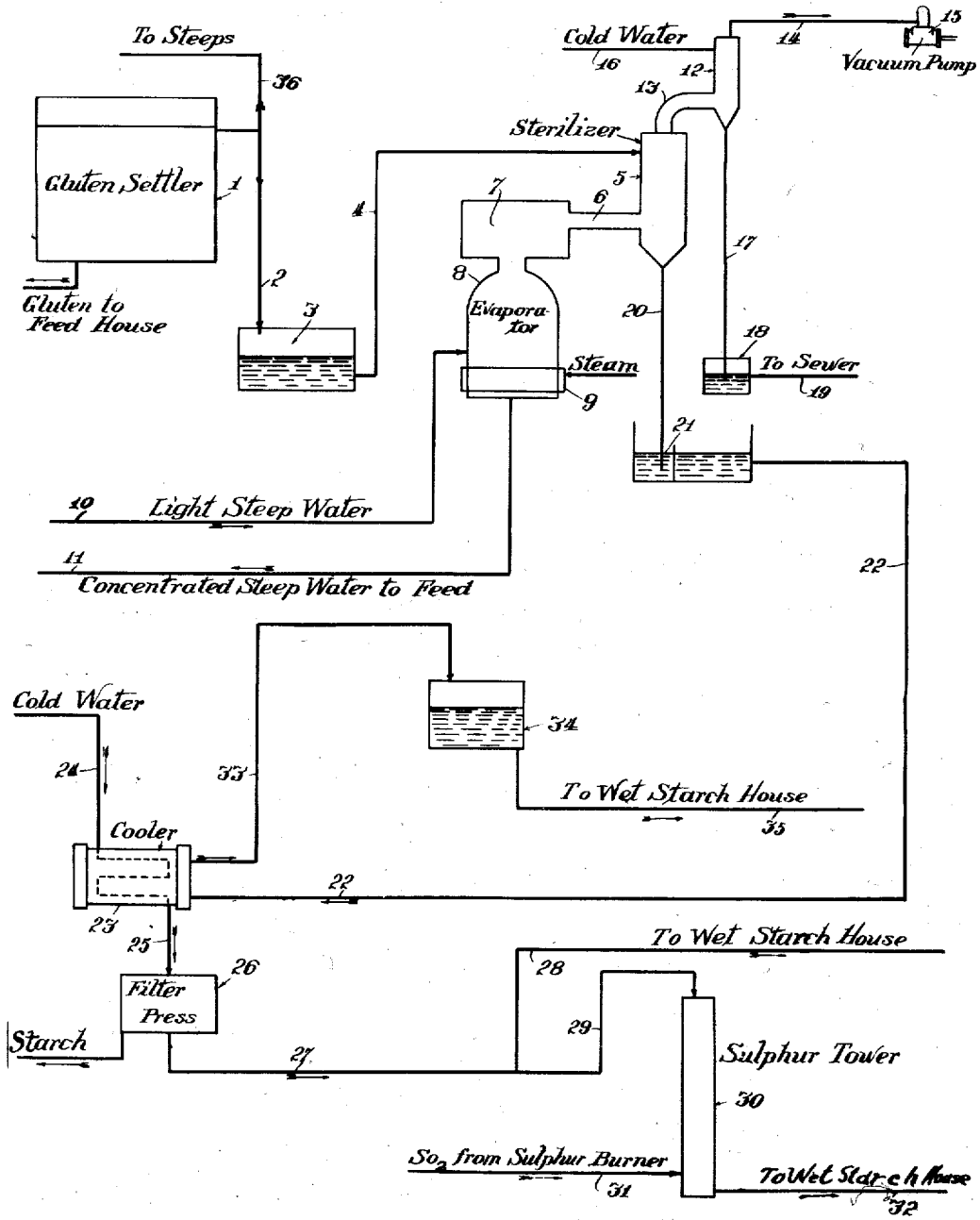

Patented May 18, 1926.

1,585,452

UNITED STATES PATENT OFFICE.

JOHN M. WIDMER, OF CEDAR RAPIDS, IOWA, ASSIGNOR TO PENICK & FORD, LTD. INCORPORATED, OF CEDAR RAPIDS, IOWA, A CORPORATION OF DELAWARE.

MANUFACTURE OF STARCH.

Application filed December 26, 1924. Serial No. 758,113.

My invention relates to the manufacture of starch, and its object is to provide certain improvements in the manufacture of starch, particularly in the manufacture of starch from Indian corn, involving the reuse in the process of waste waters whereby economies and advantages are obtained as follows: Valuable ingredients of the corn, both soluble and insoluble, are saved which have heretofore gone to waste; the amount of sulphur required for steeping the corn is diminished; a reduction is made in the amount of fresh water introduced into the process so that, if this water has to be filtered, as is necessary with river waters, the cost of installation and operation of filtering apparatus is reduced; and finally, the pollution of streams resulting from the present general practice of running into sewers overflow waters from the starch manufacture, is done away with. In some localities it is contrary to legal regulations to run waste waters of this sort into rivers and streams unless these waters are purified which may be a matter of very considerable expense.

In the manufacture of starch from corn, it is customary to steep the corn with dilute sulphurous acid and to evaporate the steep water which contains valuable corn solubles which are thus recovered and are ordinarily mixed with the bran and gluten of the corn in the manufacture of cattle feed. The steeped grain is broken up and the germ separated out by flotation and washed to remove starch. The starch bearing portions of the kernel are ground in burr mills and the ground material is subjected to separating operations in reels or with shaking sieves. There are usually two of these operations or series of operations, one treating the "coarse slop" and the other the "fine slop". The starch milk derived from the aforesaid separating operations is run over starch tables on which the starch settles and from which the gluten and bulk of water tails off. The starch is sometimes washed in filter presses. The gluten is separated from water in gluten settlers and, according to the usual practice heretofore, from 80% to 90% of the water from the settlers is discharged into the sewer, the remaining 10% to 20% being used ordinarily in the steeping of the grain.

This overflow water from the gluten settlers may contain 200 to 300 grains per gallon of solubles, such as protein substances, reducing sugars, mineral salts, sulphur dioxide (from the steeping and subsequent operations) together with from 15 to 40 grains per gallon of suspended insolubles. In accordance with my improvement the gluten water, heretofore discharged into the sewer as mentioned above, is returned to the process and used where it has been customary to use fresh water, for example, in the coarse and fine slop separations or in the washing of the germ. By so doing the insolubles contained therein are incorporated with the material treated and withdrawn with the same and thereby saved. As the bran, fine slop and gluten carry with them approximately one-third of all the water entering the wet starch system a corresponding proportion of the solubles are likewise withdrawn therewith. The balance of the solubles ultimately find their way to the steep house with that portion of the overflow from the gluten settler which is returned thereto, as indicated above, and are drawn off with the light steep water which is concentrated and added to the bran and gluten forming the so-called cattle-feed.

In order to prevent the gluten waters from sliming the starch bearing material undergoing separation and the reels or sieves used in such operations, the orifices of which are small and easily clogged, these waters before being returned to the process are sterilized so as to prevent or at least to arrest fermentation and decomposition. It is sufficient for the present purpose that the sterilization be carried to such a point that fermentation and decomposition be so retarded or held back that the materials which otherwise might produce the undesirable result to which I have just referred are prevented from substantially undergoing change of this character until they are removed from the process, and where in the following descriptive matter and claims I have used the word "sterilization", it is to be understood as having this broader meaning and not being limited to a complete destruction of living germs. Preferably the sterilizaton is brought about by heating the gluten overflow water (although other methods might be employed) and, as a matter of economy, the heating is preferably accomplished by means of the vapors derived from the evaporation of the steep water. The sterilized gluten water is cooled before it is returned to the process and this is preferably accomplished, also for reasons of economy, by the employment of a stream of fresh cooling water which, when warmed up by the heat transference, is utilized in the process for operations where it is desirable to use warm water, for example, in the filter pressing of starch removed from the starch tables.

The return of the gluten overflow water to the process results in the starch on the starch tables having a higher soluble content, but this is remedied by thoroughly washing the starch, for example, by filter pressing.

The annexed drawing is a flow sheet diagram illustrating the application of my invention to practice. It will be understood that the drawing illustrates a typical or preferred embodiment of the invention which may be modified considerably in matters of detail without departure from the principles on which the invention is based.

Referring to the drawing, the numeral 1 designates a gluten settler and 2 a pipe which leads the overflow water from the gluten settler to a collecting tank 3. 4 is a pipe leading from the collecting tank into the sterilizer 5 through which the gluten water may be showered or sprayed by any suitable means. The sterilizer is connected at the bottom by passage 6 with the exhausting space 7 of an evaporator or vacuum pan 8, the steam jacket of which is indicated at 9. 10 is a pipe for conducting the light steep water from the steep tanks (not shown) to the evaporator 8 and 11 a pipe for drawing off the concentrated steep water from the evaporator. The pipe 11 will ordinarily run to the feed house. 12 is a control condenser, which may be of any suitable construction, connected by passage 13 with the sterilizer. 14 is a pipe connecting the vacuum pump 15 with the condenser 12. 16 is the cold water supply pipe for the condenser control and 17 a water outflow pipe leading from the condenser to a sump 18 having an overflow 19 to the sewer. The control condenser, it will be understood, operates to maintain a proper vacuum in the evaporator. This vacuum is adjusted so that the vapors will be sufficiently hot to give the gluten water flowing through sterilizer 5 the proper temperature. This temperature is preferably about 160° Fahrenheit. By raising the gluten water to this temperature fermentation, which ordinarily sets in very quickly, is arrested so that no appreciable decomposition will take place for two or three days. As the gluten overflow water will pass through the process in less than one day an ample margin of safety is provided. The sterilized gluten overflow water passes from the sterilizer 5 through pipe 20 to a collecting vessel 21 and from there is drawn off through pipe 22 to a cooler 23 having separate passageways for the gluten overflow water and for the circulation of cold fresh water introduced into the cooler through pipe 24. The fresh water warmed by heat transference in the cooler passes through pipe 25 to the filter press 26 in which the starch from the starch tables is washed. This washing operation is particularly necessary in the improved method of this invention since the solubles in the water contained in the starch on the tables will be much increased, as compared with former practice, for example, from 200 or 300 grains per gallon to as high as 900 or 1000 grains. 27 is a pipe leading from the filter press 26 having a branch 28 leading to the wet starch house where the starch separations above referred to are carried out, and a branch 29 leading to a sulphur tower 30 supplied with sulphur dioxide through pipe 31, the resultant sulphur water being conducted through pipe 32 to the wet starch house. When sulphur water (dilute sulphurous acid) is required in the starch separating operations, it is supplied through pipe 32. Make up water, unsulphurized, is supplied by pipe 28.

The gluten overflow water cooled, for example, to 90° Fahrenheit in the cooler 23, is run through a pipe 33 to the collecting vessel 34 and from thence to the wet starch house by pipe 35. It will be understood that the sterilized gluten overflow water conducted to the wet starch house by pipe 35, the starch press filtrate sulphurized and run to the same place through pipe 32, and the unsulphurized starch press filtrate conducted to the wet starch house through pipe 28, are all used in the starch separating operations, where fresh water has been used heretofore, and in such proportions as may be found expedient. There is of course a considerable loss of water by the constant withdrawal from the wet starch system of the bran, fine slop and gluten which carry the process water with them to the extent of approximately one-third of all waters entering the wet starch system; and in the withdrawal of the starch which goes out of the process in wet condition and the above loss and withdrawal are, in the preferred embodiment of the invention disclosed, made up from the water supplied through pipes 28 and 32 since the gluten overflow water supplied through pipe 35 will obviously be insufficient for this purpose as already mentioned. A certain amount of the water from the gluten settler 1, from 10% to 20% for example, will pass through the pipe 36 to the steep house, where after being sulphurized it is used in steeping fresh grain. It is the liquor from this operation that is concentrated in the evaporator 8, from which the concentrated liquor goes to the feed house where it is incorporated with the slop and gluten.

The reasons why the advantages are obtained which have been alluded to above will now be apparent. The solubles contained in the gluten overflow water from the gluten settlers, heretofore run to waste, will, by my process, be recovered. The water from the steeps will have a considerably higher concentration. Any suspended matters in the gluten overflow water returned to the process will be entrained and recovered with the magma going through the wet starch process. The gluten overflow water contains a certain quantity of sulphur dioxide from the use of this acid during the starch separating operations. This sulphur compound, instead of being wasted, is returned to the process and re-used, effecting a saving of two-thirds in the quantity of sulphur required. As the gluten overflow water is entirely returned to the process, instead of being utilized only to the extent of 10% or 20% as heretofore, and the remainder discharged into the sewer, a frequent cause of the pollution of streams is entirely done away with. The continued re-use of the gluten water makes it necessary to introduce into the process only relatively small quantities of fresh water, which is of particular advantage where the water for the manufacture of the starch is derived from sources, such as rivers, making necessary the filtration of the water before it is used. The utilization of the vapors from the evaporator for sterilizing the gluten water and the cooling of the sterilized gluten water by heat transference to fresh water utilized in the process at places where warm water can be employed advantageously, make it possible to effect the purposes of my invention at a cost which is relatively small. That is, the recovery of solid substances heretofore wasted, and the other advantages noted, are effected in a manner which makes the improvement economically feasible.

It will be understood that the drawing illustrating the method of my invention is purely diagrammatic. Pumps and valves are to be understood where needed. Single elements, such as the settler, evaporator, filter press, will ordinarily be multiplied and used in batteries. Fully realizing the possibility of modifications in the details of operation and in the use of particular forms of apparatus without departure from the principles of my invention, I wish it to be understood that the invention is intended to cover all modifications of method and apparatus within the scope of the appended claims.

The solubles are prevented from building up in the system above a certain point by the constant withdrawal from the wet starch system of the bran, fine slop and gluten, which carries water with them to the extent of approximately one-third of the water entering the wet starch system; and also because of the higher soluble content of the light steep water.

I claim:

1. Improved method of manufacturing starch which comprises subjecting the starch bearing material in water to separating operations for removing the starch therefrom, sterilizing the water after use in these operations, and using the same in similar operations on subsequently treated starch bearing material.

2. Improved method of manufacturing starch which comprises subjecting the starch bearing material in water to separating operations for removing the starch therefrom, heating the water after use in these operations to sterilize it, and using the same in similar operations on subsequently treated starch bearing material.

3. Improved method of manufacturing starch which comprises subjecting the starch bearing material in water to separating operations for removing the starch therefrom, heating the water after use in these operations to a temperature of substantially 160° Fahrenheit, and cooling the same and using it in similar operations on subsequently treated starch bearing material.

4. Improved method of manufacturing starch which comprises subjecting the starch bearing material in water to separating operations for removing the starch therefrom, sterilizing the water after use in these operations, using the same in similar operations on subsequently treated starch bearing material, and washing the starch to remove excess of soluble substances.

5. Improved method of manufacturing starch which comprises subjecting the starch bearing material in water to separating operations for removing the starch therefrom, sterilizing the water after use in these operations, using the same in similar operations on subsequently treated starch bearing material, washing the starch to remove excess of soluble substances, and utilizing the wash water in the aforesaid separating operations on subsequently treated material.

6. Improved method of manufacturing starch which comprises subjecting the starch bearing material in water to separating operations for removing the starch therefrom, heating the water after use in these operations to a temperature of substantially 160°

Fahrenheit, cooling the same by means of a separate body of cooling water, washing the starch with said cooling water and utilizing the sterilized water and the wash water from the starch washing step for separating operations as above set forth on subsequently treated starch bearing material.

7. Improved method of manufacturing starch which comprises subjecting the starch bearing material in water to separating operations for removing the starch therefrom, heating the water after use in these operations to a temperature of subtantially 160° Fahrenheit, cooling the same by means of a separate body of cooling water, washing the starch with said cooling water, acidulating the wash water from the starch washing step and using the same with the water sterilized as aforesaid for separating operations, as above set forth, on subsequently treated starch bearing material.

8. Improved method of manufacturing starch from corn which comprises subjecting the grain in disintegrated condition and in water to a series of separating operations for obtaining therefrom, separately, the starch, the gluten, and the other ingredients of the grain, removing the water so used from the gluten, sterilizing this water and using the same for separating operations, as aforesaid, on subsequently treated grain.

9. Improved method of manufacturing starch from corn which comprises subjecting the grain in disintegrated condition and in water to a series of separating operations for obtaining therefrom, separately, the starch, the gluten and the other ingredients of the grain, and sterilizing it, washing the starch and utilizing said sterilized gluten water and the wash water from the starch washing operation in separating operations as aforesaid on subsequently treated grain.

10. Improved method of manufacturing starch from corn which comprises steeping the corn, evaporating the steep water by application of heat, subjecting the grain in disintegrated condition and in water to separating operations for removal of the starch therefrom, sterilizing the water for use in these separating operations by means of heat derived from the evaporation of the steep water, and utilizing the sterilized water for separating operations, as aforesaid, on grain subsequently treated.

11. Improved method of manufacturing starch from corn which comprises steeping the corn, evaporating the steep water by application of heat, subjecting the grain in disintegrated condition and in water to separating operations for removal of the starch therefrom, sterilizing the water for use in these separating operations by means of heat derived from the evaporation of the steep water, cooling the sterilized water by means of a separate body of cooling water, washing the starch with said cooling water, and utilizing said sterilized water and the wash water from the starch washing step in separating operations, as aforesaid, on subsequently treated material.

12. Improved method of manufacturing starch from corn which comprises steeping the corn, evaporating the steep water by application of heat, subjecting the grain in disintegrated condition and in water to separating operations for removal of the starch therefrom, sterilizing the water for use in these separating operations by means of heat derived from the evaporation of the steep water, cooling the sterilized water by means of a separate body of cooling water, acidulating the wash water from said starch washing step and utilizing said sterilized water and said acidulated water for separating operations as aforesaid, on subsequently treated material.

13. Improved method of manufacturing starch comprising subjecting successive batches of the starch bearing material to separating operations in water, and sterilizing the water used for the treatment of each batch and using the same for the succeeding batch.

14. Improved method of manufacturing starch comprising subjecting successive batches of the starch bearing material to separating operations in water, employing a portion of the water used in the separating operations on one batch of material for steeping a succeeding batch of the material, and sterilizing the remaining portion of said water and using it for separating operations on a subsequently treated batch of material.

15. In an apparatus of the class described comprising a gluten settler and a steep water evaporator, a sterilizer, a connection between said sterilizer and evaporator for leading steam from the latter through the former, and connections from the sterilizer to the gluten settler for leading overflow water from the latter through the sterilizer.

16. In an apparatus of the class described comprising a gluten separator and a water evaporator, a sterilizer connected to the evaporator to receive vapors therefrom, means for feeding gluten water from the settler through the sterilizer, a cooler connected to the sterilizer to receive gluten water therefrom, means for circulating cooling water through the cooler, and a filter press for washing starch connected to the cooler to be supplied with water therefrom.

17. In apparatus of the class described and in combination with the gluten settler and steep water evaporator thereof, a sterilizer connected to the evaporator to receive vapors therefrom and to the gluten settler to receive gluten overflow water therefrom, a cooler connected to the sterilizer to receive sterilized gluten water therefrom, means for feeding the cooler with cooling water, a filter press for washing starch connected to the cooler to receive water therefrom, and a sulphur tower connected to the filter press to receive water therefrom.

18. A process of separating and recovering solubles from starch bearing materials containing the same, comprising mixing such materials with water, thereby dissolving the solubles of the material in the water, separating the water containing the solubles, sterilizing the water, and again using it for treating the same or other bodies of like starch bearing materials, and recovering the solubles from the water in which they have been so concentrated.

JOHN M. WIDMER.

for feeding the cooler with cooling water, a filter press for washing starch connected to the cooler to receive water therefrom, and a sulphur tower connected to the filter press to receive water therefrom.

18. A process of separating and recovering solubles from starch bearing materials containing the same, comprising mixing such materials with water, thereby dissolving the solubles of the material in the water, separating the water containing the solubles, sterilizing the water, and again using it for treating the same or other bodies of like starch bearing materials, and recovering the solubles from the water in which they have been so concentrated.

JOHN M. WIDMER.

DISCLAIMER 1,585,452.—*John M. Widmer*, Cedar Rapids, Iowa. MANUFACTURE OF STARCH. Patent dated May 18, 1926. Disclaimer filed May 5, 1931, by the assignee, *Penick & Ford, Ltd. Incorporated.*

Therefore, enters the following disclaimer:

Disclaims from claims 1, 2, 4, 5, 8, 13, and 18 all processes, excepting those for manufacturing starch from corn in a system wherein the solubles formerly permitted to run to waste and the waters separated from insolubles are recovered, and wherein, in the separating operations, starch and gluten are washed from bran in a sieve system which includes sieves having minute openings, and wherein starch, gluten, and water are separated from each other at a stage following the bran-washing operation, and wherein the separated starch is washed and wash water and solubles therefrom are included in the recovery.

Further disclaims from claim 1 all processes, which do not include steeping the corn in a portion of the water which has been separated from starch and gluten subsequent to a starch tabling operation, and withdrawal of steep water and recovery of solubles therein, and the reuse of another portion of such water, in connection with necessary make-up water, in effecting separations preceding the starch tabling operation, and which do not include also washing the starch after separation thereof and reusing the wash water as make-up water.

Further disclaims from claim 4 all processes which do not include the re-use of starch wash water as make-up water and introduction of $SO_2$ into the separating system through the medium of said wash water.

Further disclaims from claim 8 all processes which do not include, as a part of the separating operations, the separation of germs from other insoluble corn constituents prior to the bran-washing operation, and which do not include steeping the corn in a minor portion of the separated water and reusing a major portion of the separated water and starch wash water, as make-up water, in separating operations preceding the step of separating starch, gluten, and water from each other.

Disclaims from claim 14, all processes which do not pertain to the manufacture of starch from grains having as constituents substantial amounts of bran and gluten constituting portions of the materials subjected to separating operations.

Further disclaims from claim 18 all processes which do not include, as a part of the separating operations, separation of germs from insoluble corn constituents prior to the bran-washing operation and which do not include, as a part of the operations of recovering solubles, the withdrawal of steep water and recovery of solubles therein.

[*Official Gazette May 19, 1931.*]

DISCLAIMER 1,585,452.—*John M. Widmer*, Cedar Rapids, Iowa. MANUFACTURE OF STARCH. Patent dated May 18, 1926. Disclaimer filed May 5, 1931, by the assignee, *Penick & Ford, Ltd. Incorporated*.

Therefore, enters the following disclaimer:

Disclaims from claims 1, 2, 4, 5, 8, 13, and 18 all processes, excepting those for manufacturing starch from corn in a system wherein the solubles formerly permitted to run to waste and the waters separated from insolubles are recovered, and wherein, in the separating operations, starch and gluten are washed from bran in a sieve system which includes sieves having minute openings, and wherein starch, gluten, and water are separated from each other at a stage following the bran-washing operation, and wherein the separated starch is washed and wash water and solubles therefrom are included in the recovery.

Further disclaims from claim 1 all processes, which do not include steeping the corn in a portion of the water which has been separated from starch and gluten subsequent to a starch tabling operation, and withdrawal of steep water and recovery of solubles therein, and the reuse of another portion of such water, in connection with necessary make-up water, in effectiing separations preceding the starch tabling operation, and which do not include also washing the starch after separation thereof and reusing the wash water as make-up water.

Further disclaims from claim 4 all processes which do not include the re-use of starch wash water as make-up water and introduction of $SO_2$ into the separating system through the medium of said wash water.

Further disclaims from claim 8 all processes which do not include, as a part of the separating operations, the separation of germs from other insoluble corn constituents prior to the bran-washing operation, and which do not include steeping the corn in a minor portion of the separated water and reusing a major portion of the separated water and starch wash water, as make-up water, in separating operations preceding the step of separating starch, gluten, and water from each other.

Disclaims from claim 14, all processes which do not pertain to the manufacture of starch from grains having as constituents substantial amounts of bran and gluten constituting portions of the materials subjected to separating operations.

Further disclaims from claim 18 all processes which do not include, as a part of the separating operations, separation of germs from insoluble corn constituents prior to the bran-washing operation and which do not include, as a part of the operations of recovering solubles, the withdrawal of steep water and recovery of solubles therein.

[*Official Gazette May 19, 1931.*]